US007809888B1

(12) United States Patent
Clark et al.

(10) Patent No.: US 7,809,888 B1
(45) Date of Patent: *Oct. 5, 2010

(54) CONTENT-AWARE CACHING TECHNIQUES

(75) Inventors: Roy Clark, Hopkinton, MA (US); John Harwood, Paxton, MA (US); James Theodore Compton, Durham, NC (US)

(73) Assignee: EMC Corporation, Hopkinton, MA (US)

( * ) Notice: Subject to any disclaimer, the term of this patent is extended or adjusted under 35 U.S.C. 154(b) by 210 days.

This patent is subject to a terminal disclaimer.

(21) Appl. No.: 11/158,722

(22) Filed: Jun. 22, 2005

Related U.S. Application Data

(63) Continuation-in-part of application No. 10/953,160, filed on Sep. 29, 2004.

(51) Int. Cl.
*G06F 13/00* (2006.01)

(52) U.S. Cl. ............... 711/118; 711/207; 711/216; 711/E12.019

(58) Field of Classification Search .............. 711/138, 711/120, 216, 207
See application file for complete search history.

(56) References Cited

U.S. PATENT DOCUMENTS

| | | | | |
|---|---|---|---|---|
| 4,785,398 A | * | 11/1988 | Joyce et al. ............... 711/3 |
| 5,684,976 A | * | 11/1997 | Soheili-Arasi et al. ...... 711/128 |
| 5,748,985 A | * | 5/1998 | Kanai .................. 711/130 |
| 5,909,695 A | * | 6/1999 | Wong et al. ............ 711/133 |
| 6,052,697 A | * | 4/2000 | Bennett et al. ........... 707/205 |
| 6,453,404 B1 | * | 9/2002 | Bereznyi et al. ........... 711/171 |
| 6,530,003 B2 | * | 3/2003 | Bakke et al. ............. 711/162 |
| 6,789,156 B1 | | 9/2004 | Waldspurger ............... 711/6 |
| 6,820,170 B1 | * | 11/2004 | Elnathan et al. ........... 711/108 |
| 7,043,637 B2 | | 5/2006 | Bolosky et al. ............ 713/171 |
| 7,065,619 B1 | * | 6/2006 | Zhu et al. ................ 711/162 |
| 2002/0026511 A1 | * | 2/2002 | Garcia-Luna-Aceves et al. ................. 709/226 |
| 2002/0116578 A1 | * | 8/2002 | Sakai et al. .............. 711/118 |
| 2002/0169926 A1 | * | 11/2002 | Pinckney et al. .......... 711/118 |
| 2002/0184333 A1 | * | 12/2002 | Appelman ............... 709/217 |
| 2003/0046492 A1 | | 3/2003 | Gschwind et al. |
| 2004/0034750 A1 | | 2/2004 | Horn |
| 2004/0103247 A1 | * | 5/2004 | Bita et al. ............... 711/114 |

* cited by examiner

*Primary Examiner*—Jasmine Song
*Assistant Examiner*—Victor W Wang
(74) *Attorney, Agent, or Firm*—BainwoodHuang

(57) ABSTRACT

A caching technique involves receiving a cache request to move data into a cache (or a particular cache level of a cache hierarchy), and generating a comparison between content of the data and content of other data already stored within the cache. The caching technique further involves providing a caching response based on the comparison between the content of the data and the content of the other data already stored within the cache. The caching response includes refraining from moving the data into the cache when the comparison indicates that the content of the data is already stored within the cache. The caching response includes moving the data into the cache when the comparison indicates that the content of the data is not already stored within the cache. Such a technique is capable of eliminating data redundancies within a cache (or within a particular cache level of a cache hierarchy).

4 Claims, 6 Drawing Sheets

| CONTENT SIGNATURE 54(1) | CACHE LOCATION POINTER 56(1) | OUTER ADDRESS LOCATION C/S 58(1)(a) | OUTER ADDRESS LOCATION C/S 58(1)(b) | ... |
|---|---|---|---|---|
| CONTENT SIGNATURE 54(2) | CACHE LOCATION POINTER 56(2) | OUTER ADDRESS LOCATION C/S 58(2)(a) | OUTER ADDRESS LOCATION C/S 58(2)(b) | ... |
| CONTENT SIGNATURE 54(3) | CACHE LOCATION POINTER 56(3) | OUTER ADDRESS LOCATION C/S 58(3)(a) | OUTER ADDRESS LOCATION C/S 58(3)(b) | ... |
| CONTENT SIGNATURE 54(4) | CACHE LOCATION POINTER 56(4) | OUTER ADDRESS LOCATION C/S 58(4)(a) | OUTER ADDRESS LOCATION C/S 58(4)(b) | ... |
| CONTENT SIGNATURE 54(5) | CACHE LOCATION POINTER 56(5) | OUTER ADDRESS LOCATION C/S 58(5)(a) | OUTER ADDRESS LOCATION C/S 58(5)(b) | ... |
| ... | ... | ... | ... | |

FIG. 3

CONTENT-AWARE CACHING TECHNIQUES

CROSS REFERENCE TO RELATED APPLICATIONS

This Patent application is a Continuation-in-Part of U.S. patent application Ser. No. 10/953,160 filed on Sep. 29, 2004, entitled, "CONTENT-AWARE CACHING TECHNIQUES", the contents and teachings of which are hereby incorporated by reference in their entirety.

BACKGROUND

In general, a cache is high-speed memory which sits between outer level storage (e.g., disk drive memory) and computerized processing circuitry (e.g., a processor) which stores data into and retrieves data from the outer level storage. When the processing circuitry requires data from the outer level storage, cache circuitry (e.g., a cache controller) moves a copy of the data from the outer level storage into the cache, and the processing circuitry then reads the copy of the data from the cache. If the processing circuitry needs to retrieve the data again and if the copy of the data still resides in the cache, the processing circuitry can simply re-read the copy of the data from the cache (i.e., a cache hit). Similarly, when the processing circuitry stores data to the outer level storage, the processing circuitry writes the data into the cache, and cache circuitry moves a copy of the data into the outer level storage (e.g., the cache circuitry simultaneously writes the data to the outer level storage if the cache is a write-through cache, the cache circuitry writes the data to the outer level storage at a later time if the cache is a copy-back cache, etc.).

Conventionally, the cache circuitry manages data in a location-aware manner. That is, the cache circuitry associates copies of data within the cache with the location, or address, of where the data resides in the outermost level of memory (e.g., disk drive memory). For example, suppose that locations X and Y of the outermost level of memory contain data. When the processing circuitry requires access to the data at location X, the cache circuitry responds by moving a copy of the data from location X into the cache. Furthermore, when the processing circuitry requires access to the data at location Y, the cache circuitry responds by moving a copy of the data from location Y into the cache. If location X and location Y contain the same data, multiple copies of the same data will reside in the cache.

It should be understood that some computer architectures include multiple caches arranged in a hierarchical manner, i.e., a cache hierarchy having a series of cache levels. For example, some computer architectures utilize a Level 1 (or L1) cache and a Level 2 (or L2) cache in addition to a standard dynamic RAM cache. For such architectures, copies of data consumed by the processing circuitry typically migrate from the outermost level of storage, into the standard dynamic RAM cache, then into the Level 2 cache, and then into the Level 1 cache before reaching the processor. Similarly, for data written by the processing circuitry, copies of the data migrate from the Level 1 cache, then into the Level 2 cache, and then into the standard dynamic RAM cache before finally being stored into the outermost level of storage. If the processing circuitry consumes copies of the same data from two different locations of the outermost level of storage, or if the processing circuitry writes copies of the same data to two different locations of the outermost level of storage (e.g., locations X and Y), multiple copies of the same data move through each level of the cache hierarchy.

SUMMARY

Unfortunately, there are deficiencies to the above-described conventional location-aware caching approach. In particular, suppose that locations X and Y of an outermost level of storage contain the same data. An access to location X and then an access to location Y results in the cache circuitry moving redundant copies of the data into the cache. Similarly, if the processing circuitry writes the same data to locations X and Y of the outermost level of storage, the cache circuitry stores redundant copies of the data into the cache, i.e., one copy for location X and one copy for location Y. Such operation provides inefficient use of the cache since the redundant copies of the data consume cache memory space that could otherwise be used to store other data.

Additionally, in the context of a cache hierarchy having multiple cache levels, the above-described inefficiency occurs at each cache level. In particular, a Level 1 cache will store multiple copies of the same data. Similarly, a Level 2 cache will store multiple copies of the same data, and so on.

Furthermore, in the context of a cache mirror having mirroring caches which are connected by way of a link, caching of redundant copies of data results in additional traffic through the link. That is, when the cache circuitry stores a redundant copy of data on a first side of the cache mirror, the same data must pass through the link so that the other side of the cache mirror properly mirrors the first side thus increasing traffic through the link.

In contrast to the above-described conventional location-aware caching approach, embodiments of the invention are directed to techniques for content-aware caching. With content-aware caching, knowledge of data content affects control and data-location association mechanisms of a control circuit when operating on a cache, or when operating on a particular cache level of a cache hierarchy, thus enabling the control circuit to eliminate data redundancies. In particular, with content-aware caching, the control circuit can keep only a single copy of data representing two locations of the outermost level of storage at each cache level for maximum efficiency. Elimination of redundant copies of data frees up precious cache resources which can be used to hold unique data content from other accesses.

One embodiment of the invention is directed to a caching technique which involves receiving a cache request to move data into a cache (or into a particular cache level of a cache hierarchy), and generating a comparison between content of the data and content of other data already stored within the cache. The caching technique further involves providing a caching response based on the comparison between the content of the data and the content of the other data already stored within the cache. In particular, the caching response includes refraining from moving the data into the cache when the comparison indicates that the content of the data is already stored within the cache. However, the caching response includes moving the data into the cache when the comparison indicates that the content of the data is not already stored within the cache. Such a technique is capable of eliminating data redundancies within a cache (or within a particular cache level of a cache hierarchy).

It should be understood that there are a variety of forms for the data. For example, in some arrangements, the data is handled in the form of data blocks which are ultimately associated with block segments of disk drive memory. In other arrangements, the data is handled in the form of files, or portions of files, and the cache is a section of memory dedicated to file buffering.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 3 is a block diagram of a data structure which is utilized by the caching circuit of FIG. 2.

DETAILED DESCRIPTION

Embodiments of the invention are directed to techniques for content-aware caching. With content-aware caching, knowledge of data content affects control and data-location association mechanisms of a caching circuit when operating on a cache, or when operating on a particular cache level of a cache hierarchy, thus enabling the caching circuit to eliminate data redundancies. In particular, with content-aware caching, the caching circuit can keep only a single copy of data representing two locations of an outermost level of storage at each cache level for maximum efficiency. Elimination of redundant copies of data frees up precious cache resources which can be used to hold unique data content from other accesses.

Figure 1:
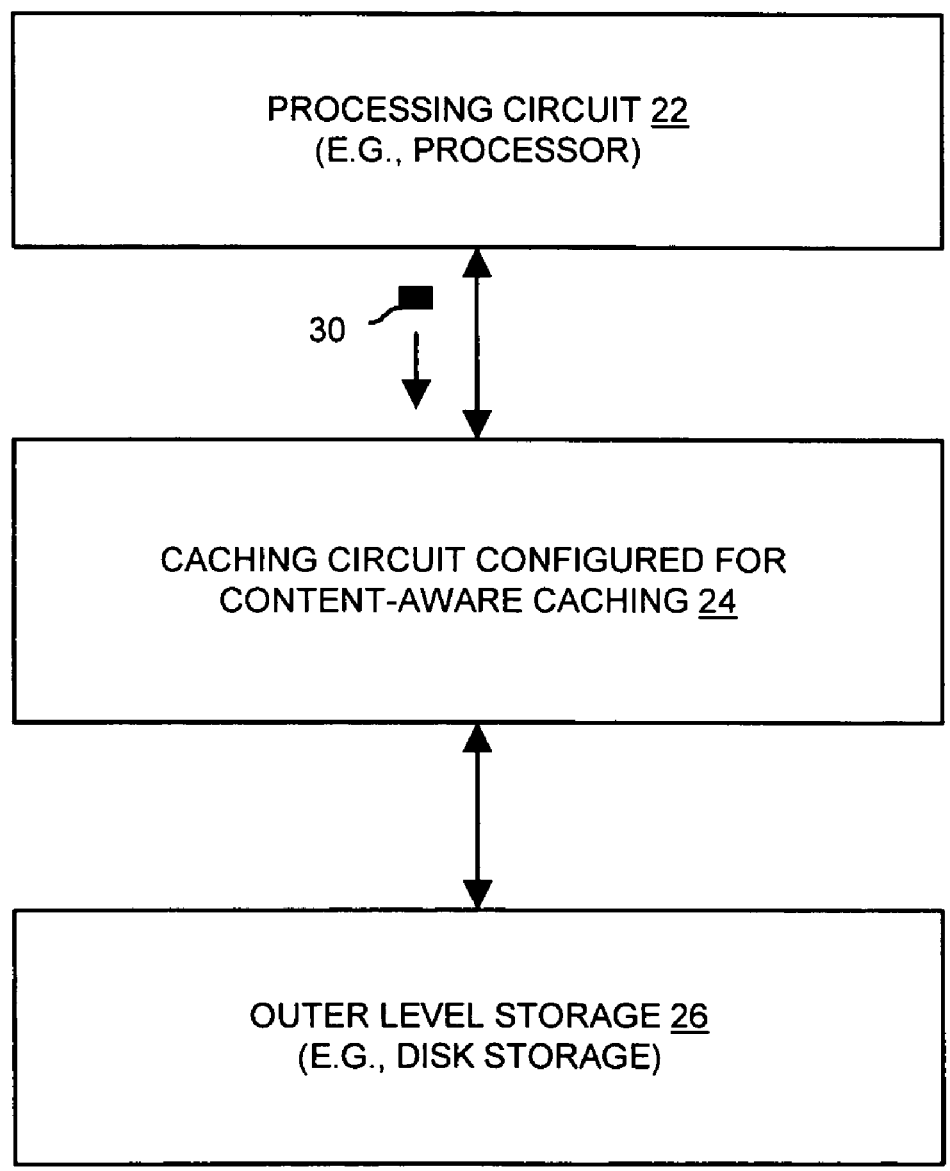
FIG. 1 is a block diagram of a computer system which is suitable for use by the invention.

FIG. 1 shows a computer system 20 which is suitable for use by the invention. The computer system 20 includes a processing circuit 22 (e.g., a processor within a microprocessor chipset), a caching circuit 24, and outer level storage 26 (e.g., non-volatile disk storage). The processing circuit 22 utilizes the caching circuit 24 as a high-speed buffer which temporarily holds (i) copies of data retrieved from the outer level storage 26, and (ii) copies of data to be stored into the outer level storage 26 (writing of data content from the processing circuit 22 into the caching circuit 24 is illustrated by the block 30 in FIG. 1). Accordingly, the processing circuit 22 is capable of enjoying certain optimizations offered by the caching circuit 24 such as high-speed access to the data in certain situations (e.g., during a re-reading of data previously fetched from outer level storage if that data still resides in the cache, due to pre-fetching of new data in anticipation of a need for that data, etc.).

However, in contrast to conventional caching approaches which involve caching data in a location-aware manner (e.g., caching a copy of the data from location X of outermost storage and a copy of the data from location Y of outermost storage even if the data at locations X and Y is the same), the caching circuit 24 performs content-aware caching. That is, before a copy of any data moves into the caching circuit 24, circuitry within the caching circuit 24 evaluates the content of that data to determine whether that content already resides within the caching circuit 24. If the content is already present in the caching circuit 24, the circuitry of the caching circuit 24 performs a simple update of its content records. On the other hand, if the content is not already present and thus unique, the circuitry of the caching circuit 24 moves the copy of the data into the caching circuit 24 and updates its content records. Along these lines, the caching circuit 24 is capable of operating in either a write-through or a copy-back manner, either of which nevertheless utilizes the content-aware caching advantages of the caching circuit 24.

It should be understood that there is a distinction between (i) a data transmission from one particular device to another and (ii) data content (i.e., the payload or body within the data transmission). In any data transmission between devices, there can be information that accompanies or frames the data content. This information may include control and status information that is specific to the particular transmission but not cogent to the data content itself. Such ancillary information is typically provided to ensure proper operation of lower level protocols such as the destination address for the data content, error checking or correction bits associated with the transmission, etc. However, such information is not often considered content (e.g., text data, numerical data, video content, executable code, etc.) which is processed by higher level applications. Accordingly, in the context of determining whether to cache data, it should be understood that the caching circuit 24 scrutinizes data content which survives from one storage level to another (not data transmissions which may be different simply due to differences in accompanying control/status information but which may contain the same data content).

It should be further understood that the above-described content-aware caching maximizes cache efficiency by introducing knowledge of data content into the control and data-location association mechanisms within a cache hierarchy. In contrast to conventional cache hierarchies which are location-aware, the cache hierarchy of the computer system 20 stores recently accessed content data and associates this data with the address(es), or location(s), of where the data resides in the outermost level of storage. Accordingly, there are no data redundancies in any caches levels of the hierarchy and the elimination of such redundancies frees up cache resources (i.e., memory space, overhead operations, etc.) which can be used to hold unique data content from other accesses. As a result, the effective size of the cache is increased in proportion to the amount of like-data being accessed at any given point in time. Further details of the invention will now be provided with reference to FIG. 2.

Figure 2:
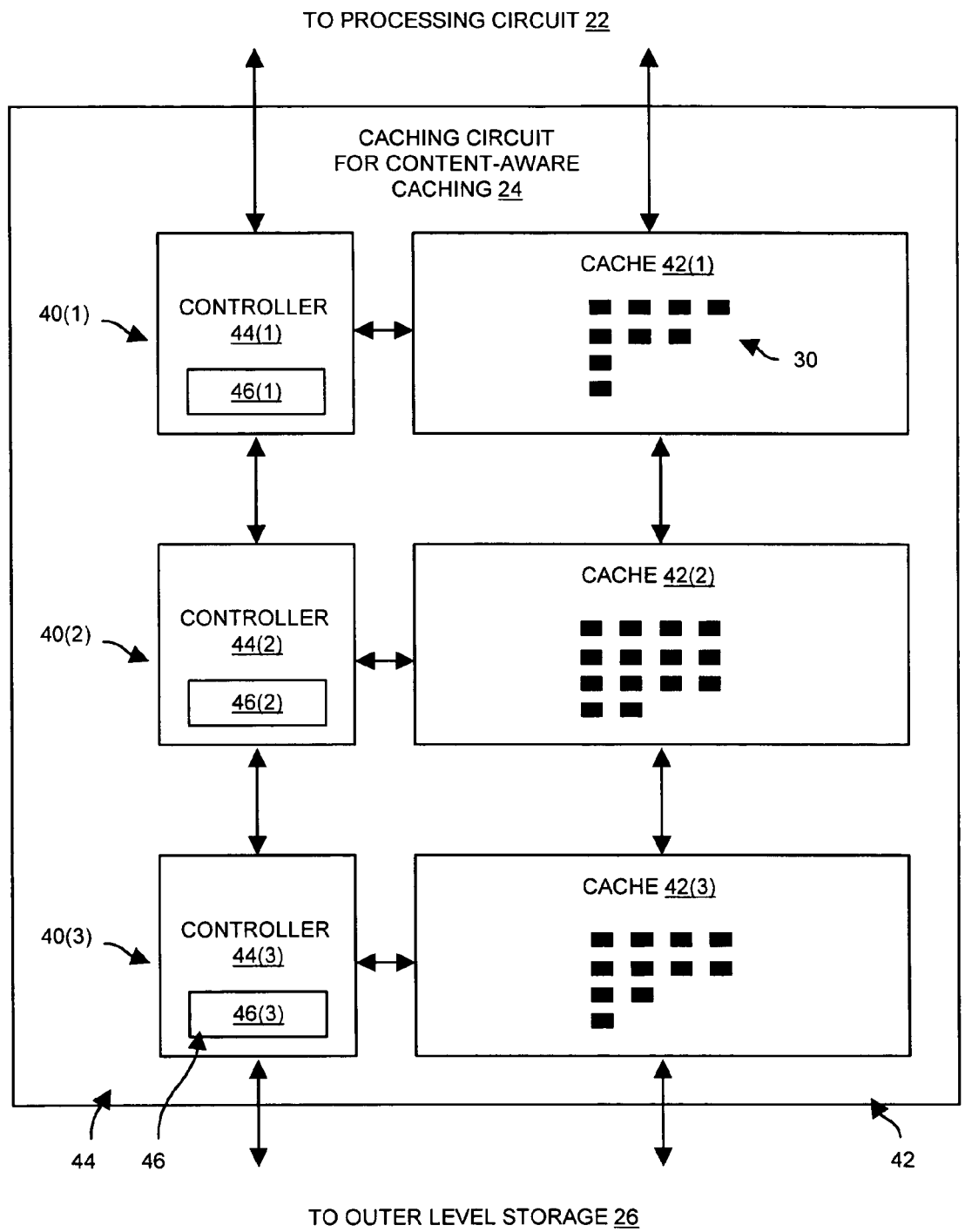
FIG. 2 is a block diagram of a caching circuit of the computer system of FIG. 1.

FIG. 2 is a block diagram of the caching circuit 24 of the computer system 20. The caching circuit 24 includes at least one cache tier. For illustrative purposes only, the caching circuit 24 is shown in FIG. 2 as including multiple cache levels 40(1), 40(2), 40(3) (collectively, cache levels 40) which are arranged in a hierarchical manner between the processing circuit 22 and the outer level storage 26. In this example, the cache level 40(1) is disposed closest to the processing circuit 22 and farthest from the outer level storage 26. The cache level 40(3) is disposed closest to the outer level storage 26 and farthest from the processing circuit 22. The cache level 40(2) is disposed between the cache levels 40(1) and 40(3). In other arrangements, the caching circuit 24 includes a number of tiers which is different than three (e.g., one, two, four, etc.).

It should be understood that the diagram of FIG. 2 is a logical layout of the cache levels 40. Physically, the cache levels 40 are capable of residing in separated or distributed locations. For instance, in one arrangement, the cache level 40(1) resides within a packaged microprocessor adjacent processor circuitry (i.e., the processing circuit 22) for extremely fast access. Additionally, the cache level 40(2) resides outside the packaged microprocessor but in close proximity for very fast access (e.g., SRAM). Furthermore, the cache level 40(3) resides off the motherboard (e.g., DRAM on a separate circuit board or daughter card) for access which is still substantially faster than access of non-volatile disk memory. Other cache level placements and configurations are suitable for use as well for the caching circuit 24.

As shown in FIG. 2, each cache level 40 includes a cache 42 and a cache controller 44 which controls access to that cache 42. In particular, the cache level 40(1) includes a cache 42(1) and an associated cache controller 44(1) which controls the cache 42(1). Additionally, the cache level 40(2) includes a cache 42(2) and an associated cache controller 44(2) which controls the cache 42(2). Furthermore, the cache level 40(3) includes a cache 42(3) and an associated cache controller 44(3) which controls the cache 42(3). As illustrated by the various arrows within FIG. 2, the components of the caching circuit 24 are well-configured to support progressive data flow between the processing circuit 22 and the outer level storage 26 in either a write-through or a copy-back manner. That is, data from the processing circuit 22 migrates through the cache levels 40 of the hierarchy to the outer level storage 26 in one direction. Similarly, data from the outer level storage 26 migrates through the cache levels 40 to the processing circuit 22 in the opposite direction.

In the context of each cache level 40, when the cache controller 44 receives a cache write request to cache data (i.e., an incoming WRITE), the cache controller 44 generates a comparison between content of the data and content of other data already stored within that cache 42. The cache controller 44 generates this comparison by applying a hashing algorithm to the content and by accessing a content database 46(1), 46(2), 46(3) (collectively, content databases 46) which is maintained by the cache controller 44 (see FIG. 2). Further details of this operation will be provided shortly with reference to FIG. 3. The cache controller 44 then provides a caching response based on the comparison between the content of the data and the content of the other data already stored within that cache 42.

In particular, the caching response includes moving the content into the cache 42 when the comparison indicates that the content is not already stored within the cache 42. Here, the content is unique and not already stored within the cache 42. Accordingly, the cache controller 44 moves the content into the cache 42 for effective and efficient cache utilization, and updates its content database 46 to indicate (i) that the this unique content is now in the cache 42 and (ii) that such content corresponds to a particular outer level storage location (e.g., location X of disk storage).

However, the caching response alternatively includes refraining from moving the content into the cache 42 when the comparison indicates that the content is already stored within the cache 42. Here, the data is not unique and, if the cache controller 44 were to move the content into the cache 42, redundant copies of the same content would exist in the cache 42 resulting in inefficient cache utilization. Accordingly, in this situation, the cache controller 44 does not move the content into the cache 42. Rather, the cache controller 44 simply updates its content database 46 to indicate that the pre-existing content corresponds to another outer level storage location (e.g., location Y of disk storage).

Similarly, when the cache controller 44 receives a cache read request to provide data (i.e., an incoming READ), the cache controller 44 is capable of generating a comparison between content of the data and content of other data already stored within that cache 42 (e.g., if the cache controller 44 cannot find the data within the cache 42 in a location-aware manner). Such a comparison involves application of a hashing algorithm to the content (perhaps by circuitry of an outer cache level) and accessing of a content database 46. The cache controller 44 then provides a caching response based on the comparison between the content of the data and the content of the other data already stored within that cache 42. Specifically, the cache controller 44 provides the data content if it already exists within the cache 42 (i.e., a cache hit), or moves a copy of the data from outer level storage into the cache 42 and then provides the data content (i.e., a cache miss). The cache controller 44 then updates its content database 46 in either situation. As a result, the cache 42 stores only one copy of the data thus freeing up cache resources which can be used to hold unique data content from other accesses. Further details of the invention will now be provided with reference to FIG. 3.

FIG. 3 is a block diagram of a content database 46 which is maintained by the cache controller 44 of each cache level 40. The content database 46 is illustrated in a logical table format 50 having multiple entries 52(1), 52(2), . . . (collectively, entries 52). Each entry 52 includes a content signature field 54, a cache location pointer field 56, a set of outer address location control/status fields 58. The content signature field 54 of each entry 52 is configured to store a content signature of content which is (i) stored by the cache 42 and (ii) under control of the cache controller 44. The cache location pointer field 56 is configured to store a pointer or index to the location within the cache 42 that stores the content. Each outer address location control/status field 58 is configured to store various control and status information such as information relating to an outer level storage location that stores the same content including an indicator whether the content has been written out to the next cache level, whether the content is valid or invalid, error checking/correction information, and the address of outer level storage (e.g., a physical address, a logical or virtual address, a cylinder/head/sector identifier, a linear base address, etc.). The entries 52 are capable of including other fields as well (e.g., time and date fields, authorization or privilege fields, etc.) and are capable of being implemented in a variety of ways (e.g., as linked lists, as hardware circuitry associated with cache lines, etc.).

As will now be explained in further detail, the content database 46 of a cache controller 44 operates as a list of content signatures for content which is already stored in the cache 42 controlled by that cache controller 44. For example, suppose that the cache controller 44 receives a WRITE request which instructs the cache controller 44 to write data content into the cache 42. To determine whether newly received data content is already stored within the cache 42, the cache controller 44 applies a hashing function to that content to produce a content signature which is unique to that particular content. The cache controller 44 then searches the content database 46 for the signature by comparing the signature produced by the hashing function with the signatures stored in the content signature fields 54 of the entries 52. Next, the cache controller 44 outputs a control signal based on whether the cache controller 44 found that signature in the content database 46. If the cache controller 44 finds the signature in the content database 46, the control signal has a first logical value (e.g., HIT) which directs the cache controller 44 to simply update the content database 46 without adding a redundant copy of the content into the cache 42. In contrast, if the cache controller 44 does not find the signature in the content database 46, the control signal has a second logical value (e.g., MISS) which directs the cache controller 44 to add the content into the cache 42 and then update the content database 46 accordingly.

A particular hashing function which is well-suited for producing such a signature is the MD5 algorithm which creates a 128-bit message digest from input data of any length. The signature is a digital fingerprint which is unique to that specific input data. The MD5 algorithm was developed by Professor Ronald L. Rivest of the Massachusetts Institute of Technology in Cambridge Mass. Another well-suited hashing function is SHA-1 which was developed by NIST and is specified in the Secure Hash Standard (SHS, FIPS 180). Other hashing functions which provide signatures that are unique to the particular data content are suitable for use as well.

Further details of the invention will now be provided with reference to the following example. Suppose that the content database 46 of FIG. 3 is maintained by the cache controller 44(3) of the caching circuit 24 (also see FIG. 2). Furthermore, suppose that the cache controller 44(3) receives a WRITE request to store particular data within the cache 42(3) for ultimate storage in location X of the outer level storage 26 (FIG. 1). To handle this request, the cache controller 44(3) applies the hashing algorithm to the data to obtain a signature which is unique to the data. The cache controller 44(3) then searches the content database 46(3) (FIG. 2) to determine whether the data already exists within the cache 42(3). In particular, the cache controller 44(3) compares the signature to the values stored within the content signature fields 54 of the entries 52.

If the content controller 44(3) finds a match in an entry 52 (e.g., the entry 52(4)), the content controller 44(3) knows that the content already resides in the cache 42(3) (e.g., at a location identified by the value in pointer field 56(4)). Accordingly, the cache controller 44(3) simply stores location X in an available one of the outer address location fields 58 (e.g., in one of the outer address location control/status fields 58(4)(a), 58(4)(b), . . . ). That is, the cache controller 44(3) modifies an existing entry 52 in the list to reflect that the pre-existing content within the cache represents multiple outer level storage locations (e.g., updates an outer address location control/status field 58(4)(b)). Thus, data movement from an inner cache layer to an outer cache layer is replaced with a considerably smaller metadata transfer if the content is already stored in the outer cache layer.

However, if the content controller 44(3) does not find a match in an entry 52, the content controller 44(3) knows that the content is not in the cache 42(3). Accordingly, the content controller 44(3) moves the content into the cache 42(3) and updates an entry 52 of the content database 46 (3). That is, the cache controller 44(3) adds an entry 52 to the list to indicate that the content is now stored in the cache 42(3).

At this point, it should be understood that content controller 44 of each cache level 30 performs certain standard operations to maintain the integrity of the content database 46. For example, the cache controller 44 preferably applies a least-recently-used scheme in order to re-used cache space once the cache 42 of that level 30 is full or near full. Here, the cache controller 44 chooses the least-recently used available entry 52 from the content database 46 (e.g., based on the position of the entries 52 in the content database 46 and the control/status information of those entries 52). Similarly, the cache controller 44 applies a least-recently-used schemed to re-use the fields 58 within each entry 52 if necessary (e.g., based on the position of the fields 58 within the entries 52).

It should be understood that the above-described content-aware caching techniques are well-suited for hardware cache implementations which involve caching data blocks that are ultimately associated with blocks of disk drive memory. It should be further understood that the above-described content-aware caching techniques are also well-suited for implementations within a larger software context (i.e., at the operating system level). In particular, the content-aware caching techniques work well for efficient caching of files, or portions of files, of a file system (hereinafter the term "file portion" is intended to broadly mean either a complete file or a portion of that file).

Further details of the use of these content-aware caching techniques within a file system will now be provided.

Traditionally, file systems provide caching of file system buffers that contain data retrieved from block storage devices (e.g., RAID, JBOD, direct attached physical disks, iSCSI, etc.). Such file systems reference buffer cache contents by a file identifier (FID) and a logical element address. A logical element is typically, though not in all file systems, a fixed number of contiguous "disk" blocks in size. Typical file systems hash the FID:logical element address and index into a table of memory locations containing the cached data. The original data is maintained on the disk storage itself.

For content-aware caching in the context of the computer system 20 (also see FIGS. 1-3), the data is files of a file system, and the caches 42 (FIG. 2) provide memory space for file buffer caches. Along these lines, the file system is configured to hash file buffer elements (i.e., contents of the files) to yield the content signatures 54 (i.e., file identifiers), and the cache location pointers 56 serve as references to that part of system memory dedicated to storing file buffer data values (i.e., the contents of the files), also see FIG. 3. The file system is capable of referencing file portions in the outer address locations using FID:logical element address pairs, i.e., pairs of content signatures 54 and cache location pointers 56. Furthermore, the file system maintains this information in order to, among other things, write dirty buffers back to the correct files and locations. As a result, the amount of cache memory required for (i) file buffering or (ii) allowing a greater number of file buffers to be maintained for the same memory commitment is less than conventional file system caching schemes which simply cache files multiple times even when the content of those files is the same.

Additionally, in the above-described file system context, there is bandwidth savings between the file system buffers and back-end disk storage. That is, if both the file system and the back-end disk storage agree on the content signature hash, then the file system and the back-end disk storage pass data values back and forth by simply passing the signatures for any buffers known to be cached. Such operation alleviates the need to pass the actual file contents (e.g., across a system bus, between SANs, etc.). Since the content signatures 54 are smaller than the actual file contents, there is less traffic through the communications media). A summary of certain operations of the cache controller 34 during a WRITE operation will now be provided with reference to FIG. 4.

Figure 4:
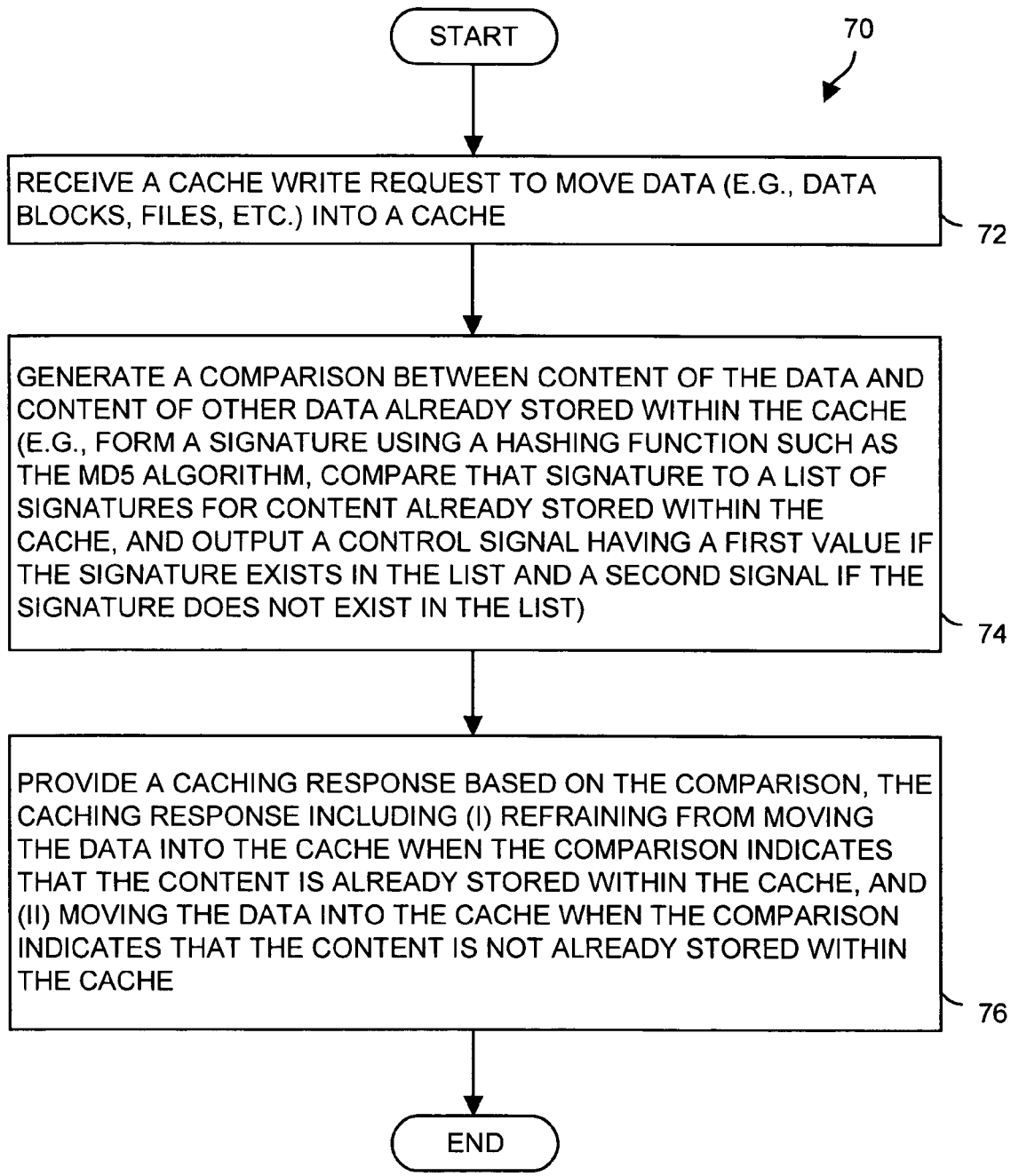
FIG. 4 is a flowchart of a procedure which is performed by a controller of the caching circuit of FIG. 2 when handling a cache WRITE request.

FIG. 4 is a flowchart of a procedure 70 which is performed by the cache controller 44 of each caching circuit 40 (also see FIG. 2) when processing a WRITE request to cache write data in its cache 42 using content-aware caching. In step 72, the cache controller 44 receives a cache WRITE request to move data into the cache 42.

In step 74, the cache controller 44 generates a comparison between content of the data and content of other data already stored within the cache 42. As mentioned earlier, this involves the cache controller 44 applying a hash function such as the MD5 algorithm to the content to form a signature which is unique to that content. Then, the cache controller 44 compares the formed signature with other signatures stored in the content signature fields 54 of the content database 46 (also see FIG. 3). If the cache controller 44 finds a match, the content is already stored in the cache 42. If the cache controller 44 does not find a match, the content does not already exist in the cache 42.

In step 76, the cache controller 44 provides a caching response based on the comparison between the content of the data and the content of the other data already stored within the cache 42. In particular, the cache controller 44 refrains from moving the data into the cache 42 when the comparison indicates that the content of the data is already stored within the cache 42. However, the cache controller 44 moves the data into the cache 42 when the comparison indicates that the content of the data is not already stored within the cache 42. In either situation, the cache controller 44 further updates the content database 46 to reflect processing of the caching request (e.g., modifies an entry 52 to indicate that content within the cache 42 corresponds to a particular location of outer level storage).

With reference back to a cache level 40 of the caching circuit 22 (see FIG. 3), it should be understood that the cache controller 44 of that cache level 40 is capable of ensuring that the cache 42 of that cache level 40 stores only one copy of data content with respect to processing a cache READ request. For example, suppose that the cache controller 44 receives a READ request instructing the cache controller 44 to provide data content corresponding to location X of the outer level storage 26. To determine whether the cache 42 already stores the data content (i.e., a cache hit), the cache controller 44 first searches the content database 46 to determine whether the cache 42 contains a copy of the data corresponding to location X. Specifically, the cache controller 44 examines the contents of all of the outer address location C/S fields 58. If the cache controller 44 finds an entry 52 for location X, the cache controller 44 provides the data content from the cache 42 (i.e., the location of the data content is identified by the contents of the cache location pointer field 56 of that entry 52).

However, if the cache controller 44 does not find location X in one of the entries 52, it is still possible that the cache 42 stores the requested data content. For example, location Y of the outer level storage 26 may store the same data content, and a copy of the data content from location Y may reside in the cache 42. To check whether this situation exists, the cache controller 44 submits a READ request to the next storage layer (e.g., the next cache level 40 or the outer level storage 26). Circuitry at that next storage layer responds initially with the content signature for the requested data content. It will be appreciated that this endeavor may require that the next storage layer may need to communicate with yet another storage layer in order to convey the content signature since ultimately the content signature is obtained by applying the hash algorithm (e.g., the MD5 algorithm) to the actual content.

When the cache controller 44 receives the content signature from the next storage layer, the cache controller 44 searches the content database 46 for an entry 52 containing the content signature in the content signature field 54 (i.e., to determine whether a copy of the data content from location Y, which is the same content as from location X, resides in the cache 42). If the cache controller 44 finds such an entry 52 (i.e., a cache hit on content), the cache controller 44 provides the content from the location identified by the cache pointer location 56 of that entry 52 and then updates the entry 52 by storing location X and related control/status information in one of the outer address location C/S fields 58 of that entry 52. If the cache controller 44 does not find an entry 52 containing the content signature (i.e., a cache miss on content), the cache controller 44 then retrieves the content from the next storage layer and provides that content. In this cache miss situation, the cache controller 44 additionally enters a new entry 52 into the content database 46 (e.g., finds the least-recently used entry 52 and updates the fields of that entry 52) so that the cache controller 44 will find the content if responding to a subsequent request for the content (e.g., based on subsequent location-aware or content-aware searching).

It should be understood that the circuitry within the next outer storage layer may itself be a cache and, thus, process READ requests in the same manner as described above. That is, the cache controller 44 of the next outer storage layer may search its content database 46 using the same techniques described above in order to (i) be responsive to READ requests but (ii) maintain storage of only a single copy of content. A summary of certain operations of the cache controller 34 during a READ operation will now be provided with reference to FIG. 5.

Figure 5:
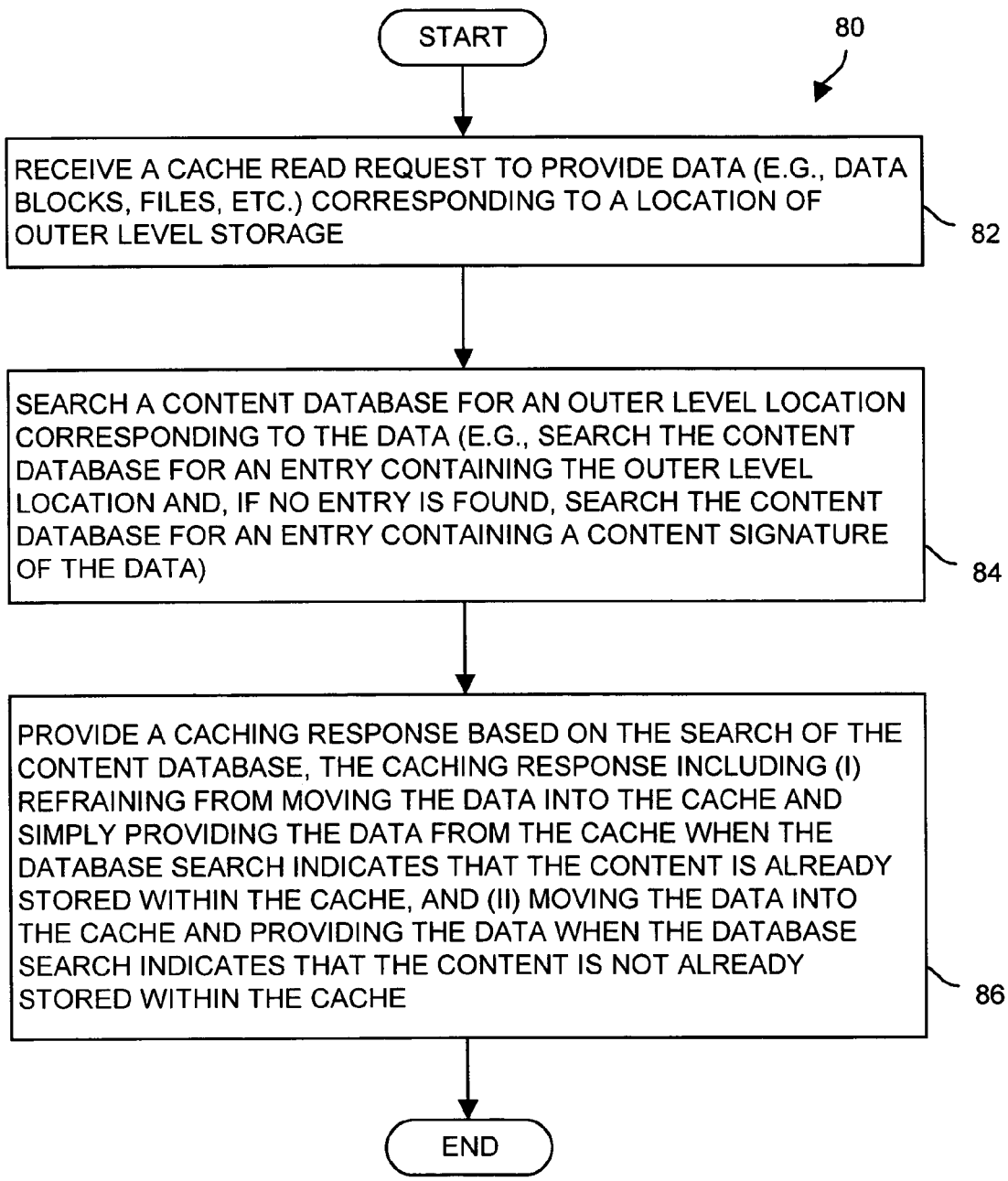
FIG. 5 is a flowchart of a procedure which is performed by a controller of the caching circuit of FIG. 2 when handling a cache READ request.

FIG. 5 is a flowchart of a procedure 80 which is performed by the cache controller 44 of each caching circuit 40 (also see FIG. 2) when processing a READ request to provide data based on content-aware caching. In step 82, the cache controller 44 receives a cache READ request to provide data corresponding to a location of outer level storage (e.g., location X).

In step 84, the cache controller 44 searches the content database 46 for an outer level storage location corresponding to the data. As mentioned earlier, the cache controller 44 searches the content database 46 for an entry 52 with the location (e.g., location X) stored in one of the outer address location C/S fields 58. If the cache controller 44 does not find such an entry 52 (a cache hit), the cache controller 44 obtains a content signature from the next cache layer and searches the content database 46 for an entry 52 containing the content signature in the content signature field 54.

In step 86, the cache controller 44 provides a cache response. In particular, if the cache controller 44 found an entry 52 for the data in the content database 46, the cache controller 44 provides the data from the cache 42 identified by the value in the cache location pointer field 56 of that entry 52. Furthermore, the cache controller 44 updates the entry 52 (e.g., updates one of the outer address location C/S fields 58 of that entry 52).

If the cache controller 44 did not find an entry 52 for the data in the content database 46, the cache controller 44 retrieves the data from the next layer of storage, stores that data into the cache 42 and outputs that data to respond to the READ request. Additionally, the cache controller 44 updates a new entry 52 (e.g., fills in the fields 54, 56, 58 of the least-recently-used entry 52). Further details of the invention will now be provided with reference to FIG. 6.

Figure 6:
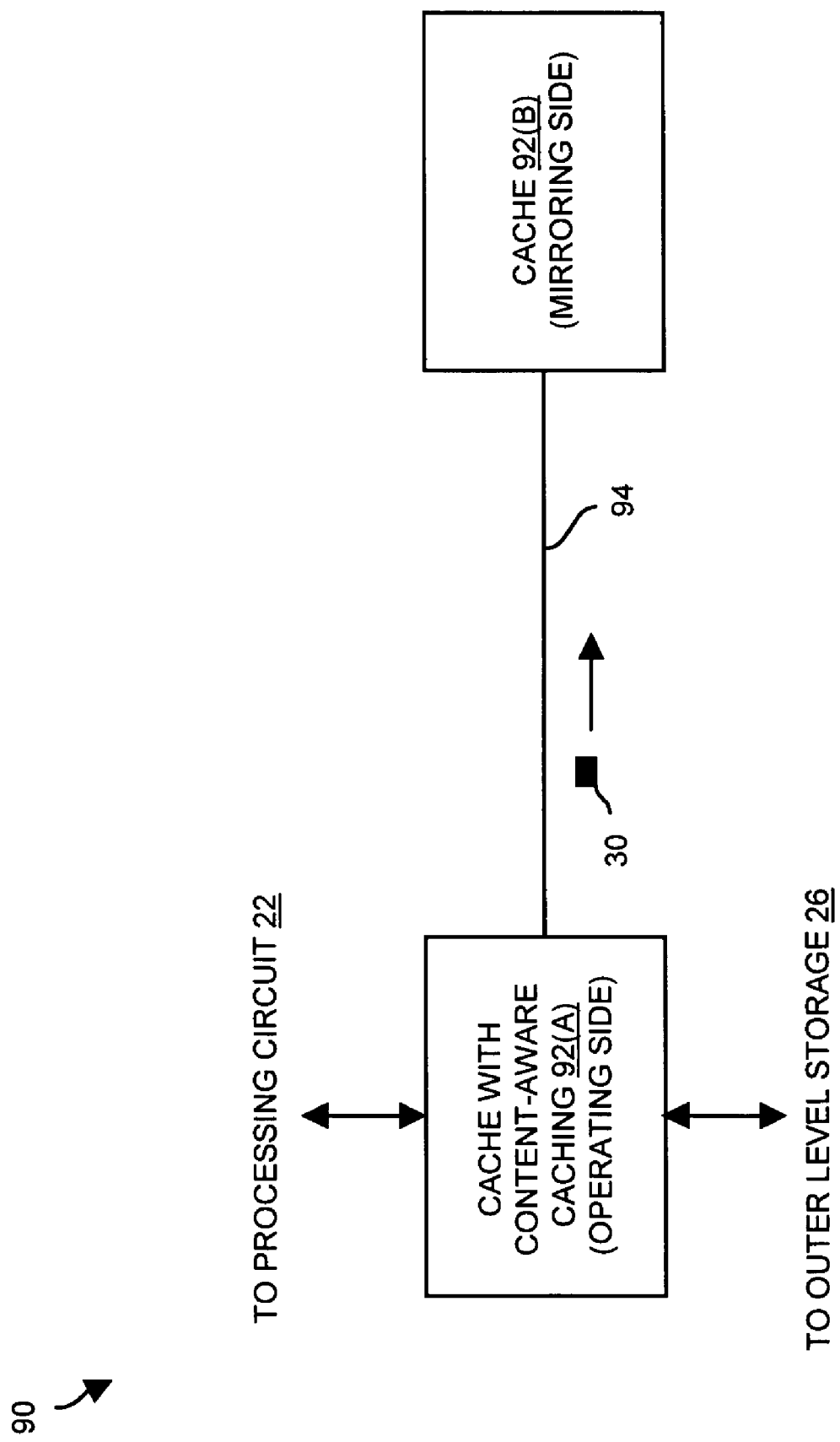
FIG. 6 is a block diagram of a cache mirroring assembly which is suitable for use as the caching circuit of FIG. 2.

FIG. 6 is a block diagram of a cache mirroring assembly 90 which is suitable for use as the caching circuit 24 (also see FIG. 2). Although the cache mirroring assembly 90 is capable of including multiple cache levels (e.g., see FIG. 2), the cache mirroring assembly 90 is shown as including only a single tier to simplify illustration.

The cache mirroring assembly 90 includes a cache 92(A) which performs content-aware caching as described above in connection with FIGS. 1 through 4. The cache mirroring assembly 90 further includes a mirroring cache 92(B) and a link 94 which connects the two caches 92(A), 92(B). Preferably, the mirroring cache 92(B) has content-aware caching capabilities for fault tolerance purposes (e.g., in the event of a failure of the cache 92(A), the mirroring cache 92(B) is capable of taking over with the same content-aware caching mechanism).

At this point, it should be understood that the operation of the cache 92(A) provides a significant reduction in link traffic over that of conventional cache mirrors. In particular, in contrast to conventional links (e.g., serial data lines) which carry data between cache mirrors, the link 94 is not burdened with having to carry any redundant copies of cached data from the cache 92(A) to the mirror cache 92(B). Rather, when the cache 92(A) refrains from caching a redundant-copy of data, there is no transfer of that copy through the link, only updates to the database 46. Accordingly, the link is more available for conveying copies of unique data in response to other access operations.

As mentioned above, embodiments of the invention are directed to techniques for content-aware caching. With content-aware caching, knowledge of data content affects control and data-location association mechanisms of a cache controller 44 when operating on a cache 42, thus enabling the cache controller 44 to eliminate data redundancies. That is, with content-aware caching, the cache controller 44 can keep only a single copy of data representing two locations of an outermost level of storage 26 at each cache level 40 for maximum efficiency. Elimination of redundant copies of data (e.g., file portions belonging to a file system) frees up precious cache resources which can be used to hold unique data content from other accesses.

While this invention has been particularly shown and described with references to preferred embodiments thereof, it will be understood by those skilled in the art that various changes in form and details may be made therein without departing from the spirit and scope of the invention as defined by the appended claims.

For example, in some arrangements, the cache controller 44 of each cache level 40 is further configured to store the data in outer level storage 26 at an address which is indexed based on the signature to provide query-based data access to the data based on the content. In such arrangements, the caching hierarchy (see the caching circuit 24 and the outer level storage 26 in FIG. 1) does not return data from a requested location. Rather, each access request specifies content and the cache hierarchy returns locations from the outermost level of storage 26 where the requested content resides. Such modifications and enhancements are intended to belong to various embodiments of the invention.

Additionally, it should be understood that the computer system 20 was described above as including only a content-aware caching circuit 24 and no conventional cache which exclusively performs location-aware caching. In other arrangements, the computer system 20 includes at least one location-aware cache and at least one content-aware cache. Furthermore, such location-aware and content-aware caches are capable of residing in various orders. In one arrangement, a processor includes internal L1/L2 caches that are not content-aware (e.g., that are only location-aware), and these internal L1/L2 caches are fed by an external content-aware L3 cache (see the examples in FIGS. 2 and 5). Such modifications and enhancements are intended to belong to various embodiments of the invention.

What is claimed is:

1. A method, performed by a first cache level of a multi-level caching circuit interposed between a processor and a disk, the method comprising:
   processing a WRITE request to write a first file portion of a first file to a first given address of the disk, wherein processing the WRITE request includes:
      receiving, at the first cache level, the first file portion from the processor;
      receiving, at the first cache level from the processor, the first given address of the disk to which the first file portion is to be written;
      determining, at the first cache level, if an equivalent file portion identical to the first file portion of the first file is already stored in a cache of the first cache level, wherein determining includes forming a signature of the first file portion using a hash function and searching the entries of a database stored within the first cache level for that signature;
      if the equivalent file portion has not already been stored in the cache of the first cache level, then:
         copying the first file portion into the cache of the first cache level, the first file portion being stored at a cache address within the cache of the first cache level; and
         adding an entry into the database, the entry indicating that the first file portion is to be written to the first given address of the disk and that the file portion is stored at the cache address;
      if the equivalent file portion has already been stored in the cache of the first cache level, then:
         updating an entry of the database to indicate that the first file portion is to be written to the first given address of the disk in addition to another address on the disk; and
         refraining from copying the first file portion into the cache of the first cache level; and
   processing a first READ request to read a second file portion of a second file to a second given address of the disk, the second file portion being identical to the first file portion wherein processing the READ request includes:
      receiving, at the first cache level, the second given address of the disk from which the second file portion is to be read;
      determining if the database indicates that contents of the second given address are stored in the cache of the first cache level by searching the database for the second given address;
      if the database indicates that contents of the second given address are stored in the cache of the first cache level by indicating that the database contains the second given address, then:
         retrieving the contents of the second file portion from the cache; and
         sending the contents of the second file portion to the processor; and
      if the database does not indicate that contents of the second given address are stored in the cache of the first cache level, then:
         sending, from the first cache level to a second cache level of the multi-level caching circuit, a second READ request to read the second file portion of the second file from the second given address of the disk;
         receiving, from the second cache level, a signature of the second file portion;
         searching the database for an entry containing the signature of the second file portion;
         retrieving the contents of the second file portion from the cache using the cache address stored in the entry containing the signature of the second file portion; and
         sending the contents of the second file portion to the processor.

2. The method of claim 1 wherein the first file portion is a portion of a data file smaller than the data file itself.

3. The method of claim 2 wherein the portion of the data file is data to be stored within a particular hardware-based block of the disk.

4. The method of claim 2 wherein the portion of the data file is data to be stored within a particular logical element of the data file, the logical element being a file system construct defining a fixed number of contiguous hardware-based blocks of the disk.

* * * * *